Patented July 4, 1944

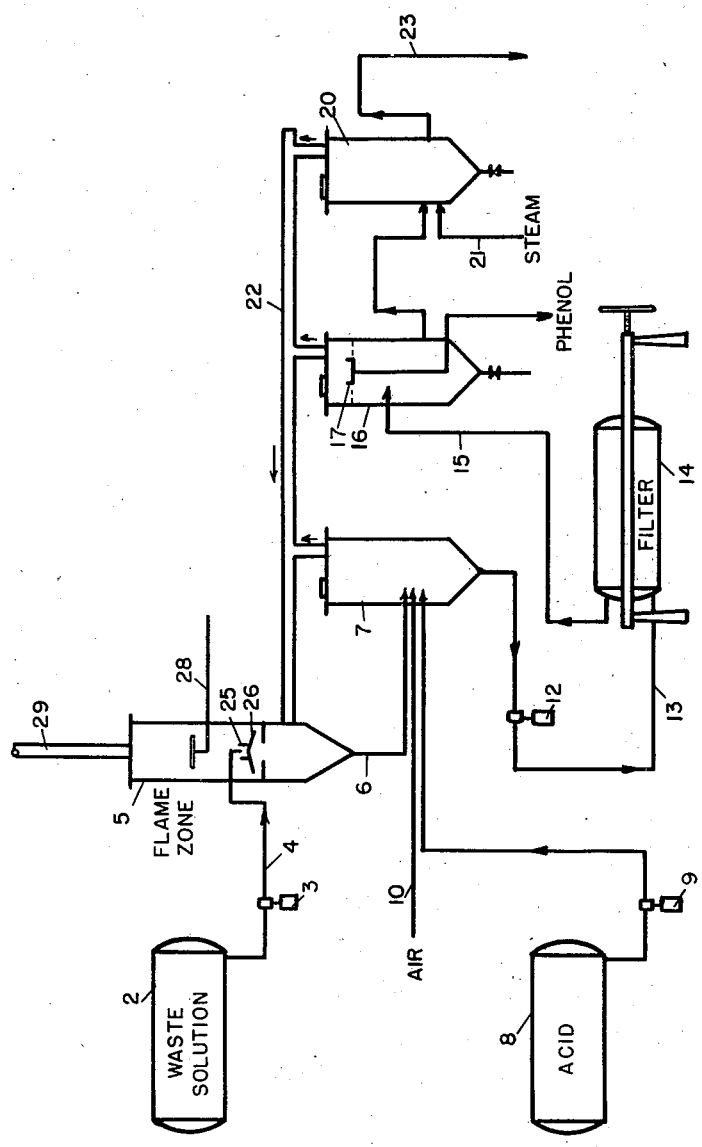

2,352,594

UNITED STATES PATENT OFFICE 2,352,594

RECLAIMING OF CONSTITUENTS FROM WASTE SOLUTIONS CONTAINING SULPHUR, ETC.

Joseph August, Jr., Cleveland, Ohio, assignor to The Standard Oil Company, Cleveland, Ohio, a corporation of Ohio Application January 6, 1941, Serial No. 373,327

5 Claims. (Cl. 23—226)

Solutions which have been employed for example in treating hydrocarbon distillates, such as gasolines, such solutions usually being of caustic soda, accumulate considerable amounts of phenols and sulphur compound. In some instances such solutions after having been employed to their maximum usability are disposed as waste, and incur disposal problems, and in other instances there is a sufficiently valuable content of phenols and sulphur to render it desirable to reclaim the values therein. By the present invention, treatment of waste of such character may be particularly conveniently and expeditiously carried out.

To the accomplishment of the foregoing and related ends, the invention, then, comprises the features hereinafter fully described, and particularly pointed out in the claims, the following description and the annexed drawing setting forth in detail certain illustrative embodiments of the invention, these being indicative however, of but a few of the various ways in which the principle of the invention may be employed.

In said annexed drawing:

The sole figure is a diagrammatic showing illustrating apparatus involved in the invention.

The waste solution to be treated, as for example a spent caustic soda solution which has been employed in connection with light petroleum distillates, is forwarded from a source of supply 2 through a pump 3 and line 4 and fume chamber 5 and line 6 to a mixing chamber 7. A mineral acid which leaves non-harmful salts or neutralization, e. g. sulphuric acid as of 66° Bé. or other suitable strength, is supplied to chamber 7 from a source of supply 8, and preferably aeration is simultaneously applied by a supply of air through line 10. Advantageously, the aeration may also provide the agitating or mixing. From the mixing and aerating chamber 7, the liquid proceeds by pump 12 in line 13 to a filter 14 which may be of any suitable form. Suspended solids, i. e., the sulphur, is here taken out, and may be further purified if desired. The filtrate proceeds by line 15 to a separator chamber 16, where liquid constituents of lighter gravity, phenols (including the higher homologs), oil, etc., separate to a top layer and are drawn off through the trap-out 17. The lower water layer then proceeds to a boiler 20 where heat is applied. Conveniently this may be by steam from line 21. Residual fumes dissolved in the liquid are thus driven off and proceed through the connection 22, while the innocuous water freed from the original constituents may discharge through line 23 to drainage or disposal. Fumes from the boiler 20, also as desired, from the separator chamber 16 and the mixing chamber 7 pass to the fume receiving chamber 5 and are scrubbed by the feed of the waste solution from line 4 on its way to the mixing and aerating chamber 7. Suitable means for distributing and thoroughly contacting the liquid with the fumes is provided, and may for instance involve a small overflow container 25 to which the pipe 4 discharges, and the liquid over-flows from the chamber 25 onto a distributor cone baffle or set of baffles 26. The fumes having been scrubbed, are then passed through a combustion zone or flame zone, as for instance a gas combustion area, the gas being supplied from line 28. Thence, residual fumes now innocuous, discharge to the atmosphere through stack 29.

Other modes of applying the principle of the invention may be employed, change being made as regards the details described, provided the features stated in any of the following claims, or the equivalent of such, be employed.

I therefore particularly point out and distinctly claim as my invention:

1. A process of treating waste solutions of caustic soda containing accumulated sulphur compounds and phenols obtained in treating hydrocarbon distillates, which comprises mixing the solution with concentrated sulphuric acid and aerating to reduce sulphur compounds to free sulphur, filtering out the sulphur, separating from the filtrate a top layer containing phenols, and subjecting the filtrate to heat while passing any fumes disengaged thereby and fumes disengaged from the mixing and separating zones through a scrubing zone in contact with the incoming feed of the waste solution on its way to the acid mixing step, and discharging the fumes from the scrubbing zone through a combustion zone.

2. A process of treating waste solutions of caustic soda containing accumulated sulphur compounds and phenols obtained in treating hydrocarbon distillates, which comprises mixing the solution with a mineral acid and aerating to reduce sulphur compounds to free sulphur, filtering out the sulphur, separating from the filtrate a top layer containing phenols, and subjecting the filtrate to heat while passing any fumes disengaged thereby and fumes disengaged from the mixing and separating zones through a scrubbing zone in contact with the incoming feed of the waste solution on its way to the acid mixing step, and discharging the fumes from the scrubbing zone through a combustion zone.

3. A process of treating waste solutions of caustic soda containing accumulated sulphur compounds and phenols obtained in treating hydrocarbon distillates, which comprises mixing the solution with a mineral acid and aerating to reduce sulphur compounds to free sulphur, filtering out the sulphur, separating from the filtrate a top layer containing phenols present, applying heat to the filtrate, and subjecting the fumes disengaged to scrubbing with the incoming feed of the waste solution on its way to the acid mixing step, and discharging the fumes from the scrubzing zone through a combustion zone.

4. A process of treating waste solutions of caustic soda containing accumulated sulphur compounds and phenols obtained in treating hydrocarbon distillates, which comprises mixing the solution with a mineral acid and aerating to reduce sulphur compounds to free sulphur, filtering out the sulphur, separating from the filtrate a top layer containing phenols present, and heating the filtrate and subjecting the fumes disengaged to scrubbing with the incoming feed of the waste solution on its way to the acid mixing step.

5. A process of treating waste solutions of caustic soda containing accumulated sulphur compounds obtained in treating hydrocarbon distillates, which comprises treating the solution with a mineral acid, filtering out the sulphur disengaged, separating from the filtrate any liquid layer of lighter gravity, and heating the filtrate and subjecting the fumes disengaged to scrubbing with the incoming feed of the waste solution on its way to the acid mixing step.

JOSEPH AUGUST, Jr.